Fig. 1b.

Inventor:
Maurice E. Bivens,
by Irving H. Marshman.
His Attorney.

Inventor:
Maurice E. Bivens,
by Irving H. Marshman
His Attorney.

United States Patent Office 2,755,394
Patented July 17, 1956

2,755,394

SEQUENCE TIMER

Maurice E. Bivens, Schenectady, N. Y., assignor to General Electric Company, a corporation of New York Application March 30, 1955, Serial No. 498,066

11 Claims. (Cl. 307—132)

This invention relates to control systems, more particularly to systems for controlling a sequence of operations or steps and it has for an object the provision of a simple, reliable, inexpensive and improved control system of this character. More specifically, the invention relates to devices for initiating a plurality of operations or steps in a predetermined sequence and separated from each other by predetermined adjustable precise time intervals.

Extreme accuracy of timing is required in many industrial operations. One example of an industrial operation which contains a sequence of steps each of which must be precisely timed is resistance welding. In resistance welding control systems, a number of load circuits or devices require energization in a predetermined sequence in order to effect the welding cycle of:

1. Moving the welding electrodes into forceful engagement with the metal to be welded during a time interval known as the "squeeze" time before initiating the flow of welding current.

2. Passing a heavy current of electricity through the metal for a predetermined interval of time known as the "weld" time.

3. Maintaining the solenoid valve energized for an interval of time, known as the "hold" time, after the termination of the welding current to hold the electrodes in forceful engagement with the metal until a homogeneous weld is formed, and 4. Separating the welding electrodes and maintaining them separated for a predetermined interval of time known as the "off" time before they are again moved into work engagement position.

According to the present standards of the National Electrical Manufacturers Association, these sequence periods must occur directly in cascade. A number of sequence controls previously have been devised which in general comprised a separate timing electric valve for each of the predetermined periods of the sequence with each timing valve performing some function through the medium of anode circuit relays or other devices. Usually a few additional sequencing valves were required to complete portions of the system operation.

In keeping with the broad object of simplification of sequence timer controls, a more specific object of this invention is the provision of a sequence timer control having but a single timing valve which provides precision timing for all the sequence periods. Still further objects of the invention are to provide improved serviceability and reduction in size and cost of the control unit.

In carrying the invention into effect in one form thereof, a single timing electric valve is provided together with a timing circuit having adjustable timing connections for timing all the sequence periods and anode circuit switching mechanism or anode relays for switching and performing the sequence control functions and switching the time adjustment settings of the timing circuit for the several sequence periods.

Recently, the automotive industry in an effort to eliminate unnecessary time loss in certain of its high speed welding operations has been specifying that the sequence timer controls must provide for deenergizing the solenoid valve a predetermined but adjustable time interval before the termination of the welding current so that for high speed operation the electrodes will separate at the end of the weld time. Since the industry standards specify that the squeeze, weld, hold, and off times be cascaded in the order named, the requirement that the timer shall provide for separating the electrodes at the termination of the welding current is in effect a requirement for provision of a negative hold time measured from the end of the weld time. Accordingly, a further and still more specific object of the invention is the provision of a sequence timer in which a single timing valve and a timing circuit with independently adjustable timing connections are provided for timing all of the periods of a sequence together with means for providing from the end of one of the timed periods both positive and negative values of the next succceeding timed period.

For a better and more complete understanding of the invention, reference should now be had to the following specification and to the accompanying drawing of which Figs. 1a and 1b together constitute a simple schematic diagram of a preferred embodiment of the invention in a resistance welding control system, and Figs. 2a, 2b, and 2c constitute a chart of characteristic curves which facilitate an understanding of the invention.

Figure 2A:
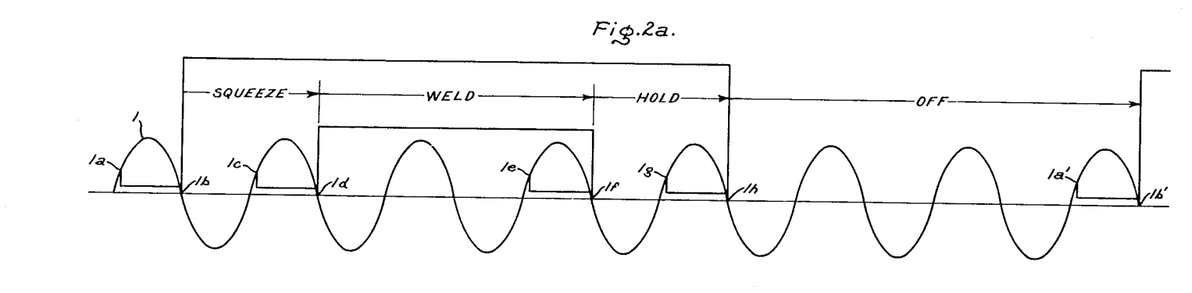
Figure 2B:
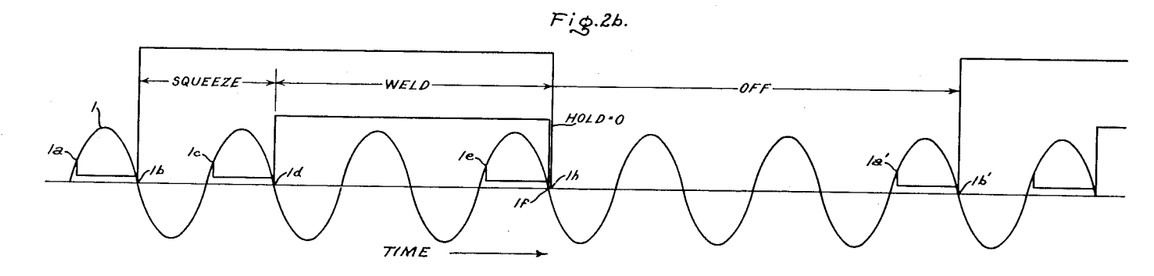
Figure 2C:
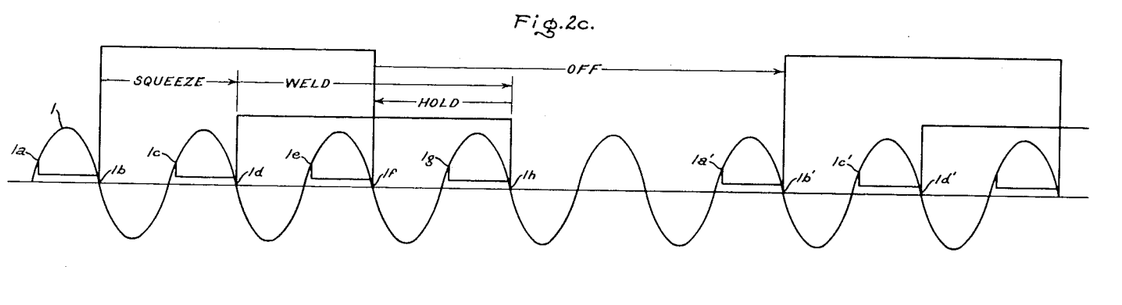

Referring now to the drawing and particularly to Figs. 2a, 2b and 2c, a sequence of timed intervals each of predetermined but adjustable duration is represented by the successive sectional intervals designated squeeze, weld, hold and off, which as previously pointed out are the periods in which occur the conventional steps of a resistance welding cycle. In Figs. 2a, 2b and 2c are illustrated three modes of operation of a resistance welding sequencing and timing control system embodying the invention. In the mode of operation illustrated in Fig. 2a, the electrodes are held in forceful engagement with the metal for a predetermined interval of time after the termination of the welding current. In other words, Fig. 2a represents a mode of operation which includes a positive hold time of which the duration is $\frac{1}{60}$ second or one cycle of an alternating voltage wave of 60 cycle frequency which is represented by the sinusoidal curve 1. A different mode of operation is illustrated in Fig. 2b in which the welding electrodes are separated at the termination of the welding current. This is known as the "zero" hold time mode of operation. In Fig. 2c is illustrated a mode of operation in which the separation of the welding electrodes is initiated a predetermined interval of time e. g., 1 cycle prior to the termination of the welding current. This is in effect a negative hold time since by industry definition the hold time begins at the termination of the weld time and the term negative hold time is used in industry in referring to this mode of operation.

Figure 1A:
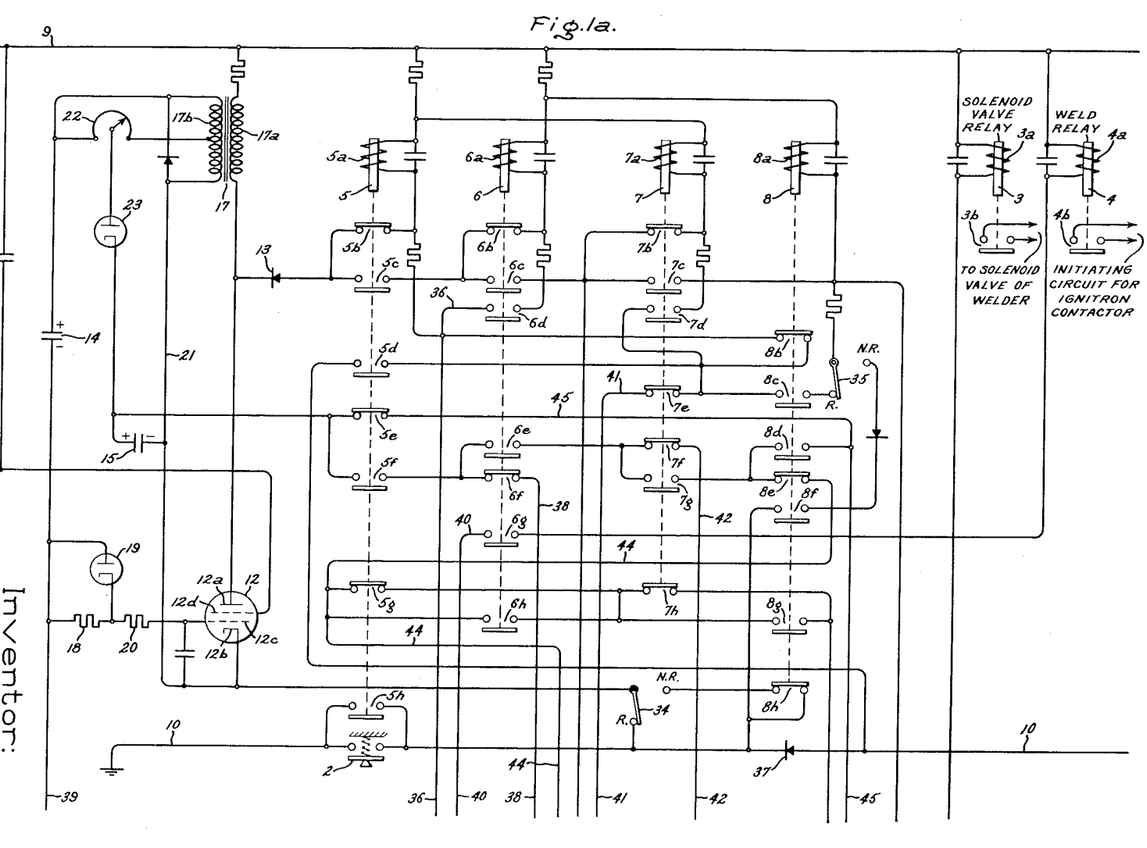
Figure 1B:
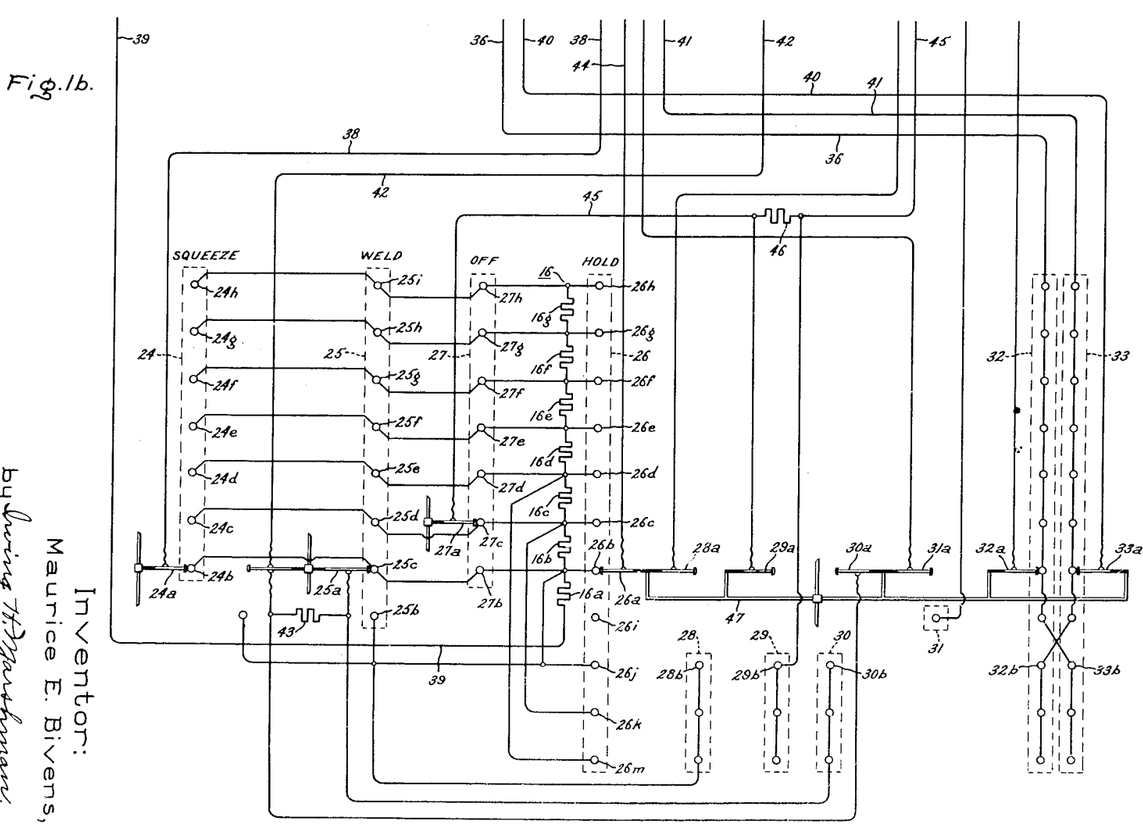

In a resistance welding control system there is provided a device for initiating sequence of steps which taken together comprise the welding cycle. This device is illustrated in Fig. 1a as a manually operated switching device 2. It could, of course, be an automatically operated switching device.

For the purpose of squeezing the electrodes into forceful engagement with the metal to be welded, there is conventionally provided in a welding machine a mechanism which includes a cylinder to which pressure fluid is admitted under the control of a solenoid valve. Energization of the solenoid of such valve is controlled by suitable means such as an electromagnetic relay 3 which is generally referred to as the solenoid valve relay. It has an operating coil 3a and a pair of normally open contacts 3b which, when closed in response to energization of the coil, complete an energizing circuit for the operating solenoid of the valve.

The flow of welding current in the welding current circuit (not shown) may be initiated and terminated by any suitable means. In Fig. 1a such means is illustrated as an electromagnetic relay 4 having an operating coil 4a and a pair of normally open contacts 4b which when closed completes the firing circuit of an ignitron contactor in the circuit of a welding transformer.

For the purpose of controlling the energization and de-energization of the relays 3 and 4 to effect a sequence of steps separated by time intervals of predetermined but independently adjustable length, a plurality of relays 5, 6, 7 and 8 are provided. These relays are connected and suitably interlocked for operation in the numerical order of their reference characters i. e. in the order 5, 6, 7 and 8. They are provided with operating coils 5a, 6a, 7a and 8a respectively which are connected to be supplied from a suitable source of supply such as is represented by the alternating voltage supply conductors 9 and 10 of which the conductor 10 is connected to ground. The conductors 9 and 10 may be considered to be respectively one terminal and a grounded center tap of a secondary winding of a supply transformer of which the opposite terminal is represented by the conductor 11. As shown, one terminal of each of the operating coils 5a, 6a, 7a and 8a is connected to the conductor 9 through a suitable resistor. A single electric valve 12 is provided for effecting the energization of the operating coils of the relays 5, 6, 7 and 8. Although this valve may be of any suitable type, it is preferably a thyratron and provided with an anode 12a, a cathode 12b, a control electrode 12c, and a shield electrode 12d. To the anode-cathode or output circuit of electric valve 12 is supplied an alternating voltage from a suitable source such as the supply terminal 9 to which the anode 12a is connected and the grounded supply terminal 10 to which the cathode 12b is connected.

As previously pointed out, one terminal of each of the relay operating coils 5a, 6a, 7a and 8a is connected to the alternating voltage supply terminal 9. The opposite terminal of coil 5a is connected through the relay's own normally closed interlock contacts 5b and rectifier 13 to the anode 12a of the timing valve 12. However in the deenergized condition of relays 5, 6, 7 and 8, the other terminal of the operating coil of each of relays 6, 7 and 8 is disconnected from the anode by means of a normally opened interlocked contact of the immediately preceding relay in the sequence.

For the purpose of controlling the valve 12 to conduct single pulses or half cycles of current and providing between such pulses predetermined but adjustable time intervals, a resistance-capacitance timing circuit is provided. It is illustrated as comprising two capacitors 14 and 15 and a resistor 16. This timing circuit embodies certain broad aspects of a double capacitor timing circuit which is disclosed and claimed in application S. N. 311,503—M E. Bivens, filed September 25, 1952, and assigned to the assignee of the present invention. Voltage for charging the capacitors is supplied from the secondary winding 17b of a transformer 17 of which the primary winding 17a is connected in the anode-cathode circuit of the valve 12 between the supply terminal 9 and the anode 12a. The charging circuit for capacitor 14 extends from the upper terminal of secondary winding 17b to one terminal of capacitor 14 and from its other terminal through the parallel combination of resistor 18 and diode valve 19, resistor 20, control electrode 12c and cathode 12b of thyratron valve 12, and conductor 21 to the opposite terminal of secondary winding 17b. The rectifiers 19 and 23 are poled so that the secondary winding 17b charges the capacitor 14 negative at the terminal which is connected to control electrode 12c. Voltage for charging capacitor 15 is supplied from the lower half of the secondary winding 17b. The circuit is traced from the calibration tap of secondary winding 17b through the active portion of a rheostat 22, diode 23, capacitor 15 to the lower terminal of the secondary winding. During conduction of valve 12 in a positive half cycle of its anode voltage, a voltage is induced in the secondary winding 17b which charges capacitors 14 and 15. Since the charge on capacitor 14 is negative toward the control electrode 12c, the valve is rendered non-conducting at the end of such half cycle of conduction, i. e. it is prevented from again conducting in subsequent positive half cycles until the charge on the capacitor has been reduced to a predetermined low value by discharging it through the discharge resistor 16 into capacitor 15.

The timing action of the capacitors is provided by means of capacitor discharge through the discharge timing resistor 16. This discharge timing circuit includes both capacitors and a selected section of the discharge timing resistor 16. To provide for individually adjusting the time interval between successive conductions of valve 12, the timing discharge resistor 16 is provided with a plurality of adjustment connections together with suitable selector switching means for preselecting a time adjustment for each of the successive periods which is to be timed by the timing circuit.

For predetermining the length of the squeeze time, a selector switching device 24 is illustrated as comprising a bank of stationary contacts each connected to a corresponding tap of the discharge resistor 16 and a co-operating movable contact member 24a. The cooperating stationary contacts are designated by the reference character 24 followed by an appropriate letter of the alphabet. Similarly, there is provided for preselecting the length of the weld, hold and off times selector switches 25, 26 and 27 respectively. Each selector switch comprises a movable contact designated by the reference character of such selector switch followed by the letter "a," and a plurality of cooperating stationary contacts each similarly designated by the reference character of the selector switch and an appropriate letter of the alphabet and each connected to a corresponding tap on the timing resistor 16.

Taps on the discharging resistor 16 are placed at points which are appropriate for producing the length of the time periods which may be required in the operation of the welder. For the purpose of illustration, it is assumed that each of the sections 16a and 16g inclusive of the discharge timing resistor produces a time interval of one cycle of a 60 cycle voltage. If all seven sections 16a to 16g inclusive are included in the timing circuit, the timing interval will be seven cycles.

Owing to the necessity of providing zero and negative hold times as previously explained, the hold selector switch 26 is provided with a plurality of additional stationary contacts 26i, 26j, 26k and 26m. The contact 26i which effects the zero hold time adjustment has no connection to the timing resistor. The contacts 26j, 26k and 26m which produce negative hold times of 1 cycle, 2 cycles, and 3 cycles respectively are connected to the same taps as are stationary contacts 26b, 26c and 26d which effect positive hold times of 1 cycle, 2 cycles and 3 cycles respectively.

Modifying the welding cycle by changing from the positive hold time mode of operation (deenergization of the solenoid valve a predetermined interval of time after termination of the welding current) to negative hold time mode of operation (deenergization of the solenoid valve at predetermined interval of time prior to termination of the welding current) involves changing the order of operation of the welding relay 3 and the solenoid valve relay 4. This is accomplished with a single timing electric valve and without changing the order of operation of the sequencing relays 5, 6, 7 and 8 by arranging the hold time adjustment selector switch 26 automatically to switch the deenergization of the weld relay from the sequencing relay 7 to the sequencing relay 8 and conversely to switch from the sequencing relay 8 to the sequencing relay 7 the deenergization of the solenoid valve relay in response to movement of the hold time adjustment selector switch to a negative hold time position and simultaneously to effect appropriate related changes in the effective portions of the discharge timing resistor to compensate for inherent timing changes caused by change in the mode of operation. These switching operations are accomplished by means of additional banks of stationary contacts 28, 29, 30, 31, 32 and 33 and by cooperating movable contacts 28a, 29a, 30a, 31a, 32a and 33a respectively.

Selector switches 34 and 35 having repeat position R. and non-repeat position N. R. provide for repeat welding cycle or single cycle operation. Single cycle operation limits the action of the control to a single cycle of the welding steps even though the initiating switch 2 is maintained closed. In repeat operation the welding cycle is repeated as long as the initiating switch 2 is maintained closed.

With the foregoing understanding of the elements and their organization, the operation of the sequence timer control to effect the four timed intervals in accordance with the three modes of operation indicated in Fig. 2 and with each of the periods independently adjustable will readily be understood from the following detailed description:

A complete welding cycle which is represented in Fig. 2a includes a squeeze time of one cycle (of a 60 cycle voltage) a welding time of 2 cycles, a positive hold time of 1 cycle and an off time of 3 cycles. To preset the control for this particular cycle, the movable contact 24a of the squeeze time adjustment selector switch is moved to the 1 cycle timing position in which it is shown and in which it engages stationary contact 24b; the movable contact 25a of the weld time adjustment selector switch is moved to the 2 cycle position in which it is shown in engagement with stationary contact 25c; the movable contact 26a of the hold time selector switch is moved to the 1 cycle position and the movable contact 27a of the off time selector switch is moved to the 3 cycle position in which they are shown. Assuming that repeat operation is desired, the selector switches 34 and 35 are moved to the repeat positions R, in which they are illustrated in the drawing. In the deenergized condition in which the system is illustrated, the discharge timing circuit capacitors 14 and 15 are substantially completely discharged and consequently control electrode 12c of timing valve 12 is at cathode potential and the valve is in readiness to fire when the anode-cathode circuit is completed.

To start the operation, the initiating switch 2 is closed to complete the anode-cathode circuit of valve 12 across the supply terminals 9 and 10. As a result, the valve becomes conducting at the point 1a in the first positive half cycle of anode voltage following the completion of the circuit as shown in Fig. 2a and the operating coil 5a of relay 5 is energized. The energizing circuit is from supply terminal 9 through operating coil 5a normally closed contacts 5b, rectifier 13, anode-cathode circuit of valve 12 to grounded terminal 10. Assuming that the relays 5, 6, 7 and 8 have pickup times of approximately one-half cycle, the relay 5 will pick up at approximately the 180° point 1b of the first positive half cycle and open its normally closed contacts 5b, 5e and 5g and close its normally open contacts 5c, 5d, 5f and 5h. Contacts 5d in closing complete an energizing circuit for the operating coil 3a of the solenoid valve relay 3 which circuit is traced from supply terminal 9 to coil 3a, movable contact 32a and cooperating stationary contact of bank 32, conductor 36 normally closed contact 8b of relay 8, contacts 5d (in the closed position thereof) rectifier 37, switch 2 to supply terminal 10. In response to energization, the solenoid valve relay 3 picks up and causes the welding electrodes to be squeezed into forcible engagement with the metal to be welded thereby initiating the squeeze period which is indicated in Fig. 2a. In their closed position contacts 5d also complete through normally closed contacts 8b of relay 8, a sealing-in circuit for the operating coil of relay 5. If the initiating switch 2 were released at this point the cycle would continue through to the end, since contacts 5h in their closed position complete a connection in parallel with the contacts of switch 2. Contacts 5c in closing complete the circuit for the operating coil 6a of relay 6 to the anode 12a of valve 12. However, this occurs so late in the positive half cycle that the current being conducted by the valve is of insufficient magnitude and duration to energize and pick up relay 6. Consequently, it remains dropped out.

As a result of conduction in the anode-cathode circuit of the valve in the first positive half cycle, a voltage is induced in secondary winding 17b of the anode transformer which charges the capacitors 14 and 15 to the polarities indicated in the drawing, as previously explained. During this first positive half cycle the capacitors 14 and 15 are fully charged, and since the capacitor 14 is charged negative at the terminal which is connected toward the control electrode 12c, the voltage of the control electrode is carried so far negative that the thyratron cannot fire in the next positive half cycle of line voltage. After the capacitors attain their maximum charge, they begin to discharge through the discharge timing circuit. This discharging circuit is traced from the positive terminal of the capacitor 14 through the secondary winding 17b, conductor 21, capacitor 15, contacts 5f (in the closed position thereof), normally closed contacts 6f, conductor 38, cooperating contact 24a and 24b of the squeeze selector switch 24, section 16a of the timing resistor and conductor 39 to the negative terminal of capacitor 14. After an interval of time equal to one cycle, which is determined by the section 16a of the timing resistor, the capacitor 14 becomes discharged to a point at which the voltage of the control electrode 12c again attains the critical firing value and causes the valve to fire in the next succeeding positive half cycle of its anode voltage. This second firing of the valve occurs at the point 1c in Fig. 2a.

In response to conduction in the anode-cathode circuit of the valve the operating coil 6a of sequence relay 6 is energized through a circuit which extends from the supply terminal 9 to the coil 6a, normally closed contacts 6b, contacts 5c (in the closed position thereof), rectifier 13, anode-cathode circuit of valve 12 to supply terminal 10. Responsively to energization, relay 6 picks up to open its normally closed contacts 6b and 6f and to close its normally open contacts 6c, 6d, 6e, 6g and 6h. Contacts 6g in closing complete an energizing circuit for the operating coil 4a of the weld relay. This circuit is traced from supply terminal 9 through coil 4a, contacts 6g (in the closed position thereof), conductor 40, movable contact 33a and cooperating stationary contact of the bank 33, conductor 41, normally closed contacts 7e of relay 7, contacts 5d of relay 5 and then as before to supply terminal 10. In response to energization, the weld relay 4 picks up at approximately the point 1d on curve 1 in Fig. 2a to complete the welding current circuit. This point 1d marks the end of the squeeze time and the beginning of the weld time. Contacts 6d in their closed position complete a sealing-in circuit for the operating coil 6a through the normally closed contacts 8b of relay 8 and the contacts 5d of relay 5 (in the closed position thereof).

Contacts 6f, in opening, interrupt the timing circuit through the squeeze time adjustment of the squeeze time selector switch 24, and contacts 6e in closing recomplete the timing circuit through the weld time adjustment connections. The recompleted portion of the timing circuit is traced from the positive terminal of capacitor 15 through contacts 5f of relay 5, contacts 6e of relay 6 (in the closed position thereof), normally closed contacts 7f of relay 7, conductor 42, one cycle block of resistance 43, movable contact 25a and cooperating stationary contact 25c and one cycle section 16a of discharge resistor 16. Thus it will be noted that the new discharge timing circuit contains 2 one cycle blocks of timing resistance to provide for a total discharge time of 2 cycles.

As a result of conduction in the anode-cathode circuit of valve 12 between the points 1c and 1d in the positive half cycle of the anode voltage, a voltage is induced in the secondary winding 17b. In the manner previously described, this voltage charges the capacitors 14 and 15. After they have obtained their maximum charge, they begin to discharge through a timing discharge circuit which is set for 2 cycles of which one is contributed by the 1 cycle resistor 43 and the other is contributed by the 1 cycle section of the tap resistor 16. As before, the charge on the capacitor 14 carries the voltage of the control electrode 12c so far negative that the valve cannot fire during the next succeeding positive half cycle of its anode voltage. However, at the end of the timed period, i. e. 2 cycles, the capacitor 14 is discharged to the point at which the voltage of the control electrode 12c attains the critical firing value and consequently the valve fires at the point designated 1e in the fourth positive half cycle of anode voltage. As a result of this third pulse of current in the anode-cathode circuit of valve 12, an energizing circuit is completed for the operating coil 7a of relay 7 which is traced from the supply terminal 9 through the coil 7a, normally closed contacts 7b, contacts 6c of relay 6 and 5c of relay 5 (in the closed position thereof), rectifier 13 to the anode-cathode circuit of valve 12. In response to energization, relay 7 picks up and opens its normally closed contacts 7b, 7e, 7f and 7h and closes its normally open contacts 7c, 7d, and 7g. The pickup of the relay 7 occurs at or near the 180° point 1f of the fourth positive half cycle in Fig. 2a. In opening, contact 7e interrupts the energizing circuit for the operating coil 4a of the weld relay 4, and in consequence, the weld relay 4 drops out to interrupt the supply of welding current to the metal being welded. This point 1f in Fig. 2a marks the end of the weld period. Since the solenoid valve relay 3 still remains picked up to maintain the welding electrodes in forcible engagement with the metal, the point 1f also marks the beginning of the hold period. Contacts 7f in opening interrupt the weld time adjustment connections through the weld time adjustment selector switch 25, and contacts 7g in closing recomplete the timing circuit through the hold time adjustment connections of selector switch 26. The recompleted portion of the timing circuit is readily traced from the positive terminal of capacitor 15 through contacts 5f, 6e, and 7g of relays 5, 6 and 7 (in the closed position thereof), normally closed contacts 8e of relay 8, conductor 44, movable contact 25a and cooperating stationary contact 26b, one cycle section 16a of tapped resistor 16. Thus it will be noted that the timing circuit for the hold time is adjusted for one cycle which is provided by the one-cycle section 16a of the timing resistor 16. In the closed position of contact 7d, a sealing-in circuit is completed for the operating coil 7a through the contacts 5d of relay 5 and thence as before to the supply terminal 10.

This third pulse of conduction in the anode-cathode circuit of the thyratron causes to be induced in the secondary winding 17b a voltage which again charges the capacitors 14 and 15. Again the charge on the capacitor 14 carries the control electrode 12c of valve 12 so far negative that it cannot fire in any subsequent positive half cycle until the capacitor 14 has been discharged to the point at which the voltage on the control electrode 12c regains its critical firing value.

At the end of the 1 cycle timing period for which the hold time selector switch 26 is set, the capacitor 14 has become discharged to the extent at which the control electrode voltage of thyratron regains the critical firing value and the thyratron fires for the fourth time. The beginning of this fourth conduction of the thyratron is designated in Fig. 2a by the point 1g on the sinusoidal curve 1. As a result of conduction in the anode-cathode circuit of the thyratron, energization of the operating coil 8a of relay 8 is established through contacts 7c, 6c and 5c of relays 7, 6 and 5 (in the closed position thereof) to the anode-cathode circuit of the thyratron. Responsively to energization, relay 8 opens its normally closed contacts 8b, 8e and 8h and closes its normally open contacts 8c, 8d, 8f and 8g. Contacts 8b in opening interrupt the energizing circuit for the operating coil 3a. Responsively to deenergization, solenoid valve relay 3 drops out, opens its contacts 3b thereby causing the welding electrodes to be released from their forcible engagement with the metal being welded. This occurs at or near the 180° point 1h of a fifth positive half cycle of anode voltage. Since the electrodes are released, this point 1h marks the end of the hold period and the beginning of the off period.

Contacts 8c in closing complete a sealing-in circuit for for the operating coil 8a which is traced through the contacts 5d and thence as before to the supply terminal 10. The opening of contacts 8e interrupts the timing circuit through the hold time adjustment of the hold selector switch 26. Contacts 8d in closing recomplete the timing circuit through conductor 45, 1 cycle time resistor 46, movable contact 27a and cooperating stationary contact 27c of off time selector switch 27, sections 16b and 16a of the timing resistor 16. Thus it will be noted that the resistance which is included in the timing circuit for timing the off period provides for a three cycle time interval of which two cycles are contributed by the sections 16a and 16b of the timing resistor and the third cycle is contributed by the external resistor 46.

As a result of the opening of contacts 8b, the sealing-in circuits for the operating coils 5a and 6a of relays 5 and 6 which were previously traced through the contacts 8b are interrupted, and as a result of their deenergization, relays 5 and 6 drop out to reclose their normally closed contacts and reopen their normally open contacts.

Contacts 5d of relay 5 in opening interrupt the sealing-in circuits for the coils of 7a and 8a of relay 7 and 8 which were previously traced to contacts 5d and consequently relays 7 and 8 drop out in response to deenergization. The opening of contacts 8d of relay 8 is not effective to interrupt the timing circuit for the off time previously established through these contacts, because prior to their opening, the closing of contact 5e of relay 5 completes a bypass circuit from the positive terminal of capacitor 15 around contacts 8b so that the timing circuit which is established through the off time selector switch 27 remain intact.

As in the case of the three previous conductions of the valve 12, its fourth conduction causes to be induced in the secondary winding 17b a voltage which recharges the timing capacitor 14 and 15. Also as before, the charge on the capacitor 14 carries the voltage of the control electrode 12c so far negative that the valve cannot again conduct in a positive half cycle of anode voltage until the capacitor 14 is discharged to a point at which the voltage of the control electrode regains the critical firing value.

At the end of the predetermined time interval of the off time, i. e. 3 cycles, the capacitor 14 is discharged sufficiently to permit the voltage of control electrode 12c to regain the critical firing value. If the initiating switch 2 is still being maintained closed at this point, the valve 12 fires a fifth time, and in response to its conduction, relay 5 picks up to initiate a repetition of the previously described welding cycle. In Fig. 2a the firing of valve 12 for the fifth time is represented by the point 1a', and the instant of pick up of relay 5 at the beginning of the new cycle is designated 1b'. It marks the end of the off time and the beginning of a new squeeze time. As long as the initiating switch is maintained closed, the timer control will continue to repeat the previously described cycle.

To effect operation in accordance with the zero hold time mode, the movable contact 26a of the hold time selector switch 26 is moved to the zero hold time position in which it engages the stationary contact 26i which has no connection to the timing resistor. Since the movable contacts 28a, 29a, 30a, 31a, 32a and 33a are all mounted on a common supporting member 47, or in some other suitable manner mechanically coupled to move together, the movable contact 31a is moved into engagement with stationary contact 31 and movable contacts 32a and 33a are moved into engagement with corresponding stationary contacts in banks 32 and 33. The engagement of contacts 31a and 31 connects the operating coils 7a and 8a of sequencing relay 7 and 8 in parallel with each other. The effect of this parallel connection on the operation of sequence timing of the sequence timing control is to energize and pick up relay 8 at the same instant as that at which relay 7 picks up. In other words, the points 1f and 1h which in the drawing designate the pick up points of relay 7 and 8 are no longer separated as in Fig. 2a but coincide as illustrated in Fig. 2b. Consequently, the deenergization and drop out of weld relay 4 in response to the pick up of sequencing relay 7 and the deenergization and drop out of solenoid valve relay 3 in response to the pick up of sequencing relay 8 also occur substantially simultaneously. The result is that the separation of the welding electrodes and the termination of the welding electrodes and the termination of the welding current occur at the same instant. There being no intervening time between the two steps in the cycle, the hold time is zero. The operation is otherwise the same as that described for the positive hold time mode of operation.

Performance of the sequence timer control in accordance with the negative hold time mode of operation is effected by moving the movable contact 26a of the hold time selector switch into engagement with one of the cooperating stationary contacts 26j, 26k, 26m, etc. Assuming that it is desired to effect separation of the welding electrodes 1 cycle of time prior to the termination of the welding current, the movable contact 26h is moved into engagement with stationary contact 26i to provide a negative hold time of 1 cycle. Owing to the common connecting member 47, this movement of contact 26a into engagement with stationary contact 26j will also effect the movement of contacts 28a, 29a, 30a, 32a and 33a into engagement with cooperating stationary contacts 28b, 29b, 30b, 32b and 33b respectively. On account of the crossover connections to provide for reversal between the banks 32 and 33 ahead of the stationary contacts 32b and 33b, the movement of contacts 32a and 33a into engagement with contacts 32b and 33b switches the operating coil 4a of the weld relay 4 out of circuit with contact 7e of the sequencing relay 7 and into circuit with contact 8b of sequencing relay 8. Similarly it switches the operating coil 3a of the solenoid valve relay 3 out of circuit with contact 8b of relay 8 and into circuit with contact 7e of relay 7. In other words, the positions of contacts 7e and 8b in the coil circuits of weld relay 4 and solenoid valve relay 3 are exchanged.

The movement of contact 30a into engagement with stationary contact 30b short circuits the 1 cycle resistor 43 in the timing circuit adjustment connection for timing the pickup of relay 7. Consequently, the time adjustment for the time interval for the pick up of relays 6 and 7 is automatically short 1 cycle.

The operation of the sequence timer control in the negative hold time mode of operation which is preset on the hold time selector switch 26 is the same as the operation in the previously described positive hold time mode of operation up to and including the point at which the sequencing relay 6 and weld relay 4 pick up. This point in the operation is designated by the point 1d on curve 1 in Fig. 2c. Since the 1 cycle resistor 43 is short circuited by contacts 30a and 30b, capacitor 14 is discharged at the end of 1 cycle to the extent at which the voltage of the control electrode 12c regains the critical firing value and causes the valve 12 to begin conducting for the third time in the welding cycle at the point 1e. At the point 1f which is at the end of the third positive half cycle of anode voltage, relay 7 picks up and in opening its normal closed contacts 7e, it deenergizes and drops out the solenoid valve relay 3 to initiate separation of the welding electrodes and the termination of the hold time and also to initiate the off time.

Since the movable contact 26a is in engagement with the stationary contact 26j, only the 1 cycle section 16a of the discharge timing resistor 16 is included in the timing circuit. Consequently, at the end of 1 cycle after the pick up of relay 7, relay 8 picks up and opens its normally closed contacts 8b to deenergize and drop out the welding relay 4 to terminate the flow of welding current and thus to terminate the weld time at the point 1h in Fig. 2c.

Since the hold time is defined as the time interval during which the solenoid valve is maintained energized after the termination of the welding current, the deenergization of such solenoid valve prior to the termination of the welding current is considered by the industry as involving a negative hold period.

The movable contact 27a of the off time selector switch, it will be remembered, was preset in engagement with the stationary contact 27c to provide an off time of 3 cycles. Since by definition, the off time begins at the end of the hold time, the off time should terminate at the end of 3 cycles after the initiation of separation of the welding electrodes. In other words, it should terminate at the point 1b' in Fig. 2c. However, the timing action of the timer for the off time is initiated by the fourth conduction of valve 12, and if permitted to time 3 cycles from the point 1h, the off time would not terminate at point 1b', but would be extended 1 cycle to terminate at point 1d' which is four cycles after the separation of the welding electrode. Such undesired 1 cycle extension of the off time is prevented by the engagement of contacts 29a and 29b to short circuit the external 1 cycle section 46 of the timing resistor in the timing adjustment connection for the off time.

Thus only the two sections 16a and 16b of the discharge timing resistor 16 remain in the timing circuit. Each of these sections is a 1 cycle section and together they provide a time delay of 2 cycles. Consequently, 2 cycles after the fourth conduction of the valve 12 to terminate the welding current, the valve fires a fifth time at the point 1a' and causes the sequencing relay 5 to pick up at the point 1b' to begin a new welding cycle three cycles after the separation of the welding electrodes at point 1f.

All in accordance with the provisions of the patent statutes, this invention has been described as embodied in concrete form and the principle thereof has been explained together in the best manner in which it is now contemplated applying that principle, it will be understood that the invention is not limited to the apparatus shown and described which is merely illustrative, since modifications and alterations will readily occur to persons skilled in the art without departing from the true spirit of this invention or from the scope of the annexed claims.

What I claim as new and desire to secure by Letters Patent of the United States is:

1. A sequence timer comprising in combination, a pair of voltage supply terminals, an electric valve having an output circuit provided with supply connections to said terminals and an input control circuit, a control device for initiating conduction in said output circuit, means for controlling said valve to conduct single pulses of current separated by predetermined time intervals comprising a resistor-capacitor timing circuit provided with connections from the capacitor thereof to said input circuit and having a plurality of timing adjustment connections and a transformer having its primary winding connected to said output circuit and its secondary windings connected to charge said capacitor, a plurality of relays designated for operation in a predetermined sequence and each having an operating coil, connections from the operating coil of the first of the relays in said sequence to said output circuit for effecting operation of said first relay in response to conduction in said output circuit, contact means operated by each of said relays for connecting to said output circuit the operating coil of the relay next in said sequence and for establishing said timing circuit through a corresponding one of said timing adjustment connections.

2. A sequence timer comprising in combination, a pair of voltage supply terminals, an electric valve having an output circuit provided with supply connections to said terminals and an input control circuit, a control device for initiating conduction in said output circuit, means for controlling said valve to conduct in said output circuit single pulses of current separated by predetermined intervals of time comprising a resistor-capacitor discharge timing circuit provided with connections from the capacitor thereof to said input circuit and having a plurality of timing adjustment connections and a transformer having its primary winding connected to said output circuit for energization by conduction in said output circuit and a secondary winding connected to charge said capacitor to a polarity to supply a turn-off voltage to said input circuit, a selector switching device for preselecting certain of said timing adjustment connections, a plurality of relays designated for operation in a predetermined sequence each having an operating coil, connections from the operating coil of the relay first in said sequence to said output circuit for effecting operation of said first relay in response to conduction in said output circuit, contact means operated by each of said relays for connecting to said output circuit the operating coil of the relay next in said sequence and for establishing said timing circuit through a corresponding one of said preselected timing adjustment connections thereby to correlate the time intervals between the sequential operation of said relays with the time intervals separating the sequential conductions of said valve.

3. A sequence timer comprising in combination, a pair of voltage supply terminals, an electric valve having an output circuit provided with supply connections to said terminals and an input control circuit, a capacitor connected to said input circuit, a control device for initiating conduction in said output circuit, a transformer having a primary winding connected to said output circuit to be energized by said conduction and a secondary winding connected to charge said capacitor to a polarity for supplying a turn-off voltage to said input circuit, a timing circuit for rendering said valve conducting at the end of a predetermined interval of time thereby to produce in said output circuit a succession of current impulses separated by time intervals comprising said capacitor, a discharge resistor therefore and a plurality of timing adjustment connections, a plurality of relays designated for operation in a predetermined sequence each provided with an operating coil, connections from the coil of the first of said relays in said sequence to said output circuit for effecting energization thereof in response to conduction in said output circuit, contacts on each of said relays responsive to energization of its operating coil for establishing said discharge timing circuit through a selected one of said timing adjustments, and additional contacts on said relays for connecting to said output circuit for energization by the next succeeding current pulse the operating coil of the relay next in said sequence.

4. A sequence timer comprising in combination, a pair of voltage supply terminals, an electric valve having an output circuit provided with supply connections to said terminals and an input control circuit, a capacitor connected to said input circuit, a control device for initiating conduction in said output circuit to be energized by said conduction and a secondary winding connected to charge said capacitor to a polarity for supplying a turn-off voltage to said input circuit, a timing circuit for rendering said valve conducting at the end of a predetermined interval of time thereby to produce in said output circuit a succession of current impulses separated by time intervals comprising said capacitor, a discharge resistor therefore having a plurality of tap connections provide a corresponding plurality of individual timing adjustments, a selector switching device for preselecting certain of said taps, a plurality of relays designated for operation in a predetermined sequence each having an operating coil, connections from the coil of the first of said relays in said sequence to said output circuit for effecting energization thereof in response to conduction in said output circuit, contacts on each of said relays responsive to energization of its operating coil for establishing said discharge timing circuit through a selected one of said tap connections, and additional contacts on said relays for connecting to said output circuit for energization by the next succeeding current pulse thereon the operating coil of the relay next in said sequence thereby to correlate the sequential operation of said relays and said time intervals.

5. A sequence timer comprising in combination a pair of voltage supply terminals, an electric valve having an anode and a control electrode and provided with supply connections from said anode and cathode to said terminals, a control device for initiating conduction in the anode-cathode circuit of said valve, means for controlling said valve to conduct single pulses of current separated by predetermined intervals of time comprising a resistor capacitor timing provided with connections from the capacitor thereof to said cathode and control electrode and having a plurality of timing adjustment connections and a transformer having its primary winding connected to be energized by conduction in said anode-cathode circuit and its secondary winding connected to charge said capacitor negative at the terminal connected to said control electrode to render said valve non-conducting, a plurality of relays designated for operation in a predetermined sequence and each having an operating coil, connections from the operating coil of the first of said relays in said sequence to said anode-cathode circuit for effecting energization thereof in response to conduction of said current pulses in said circuit, contact means on each of said relays responsive to energization of its operating coil for establishing said timing circuit through a corresponding one of said timing adjustment connections and for connecting to said anode-cathode circuit for energization by the next succeeding current pulse therein the operating coil of the relay next in said sequence thereby to correlate the sequential operation of said relays and said time intervals.

6. A sequence timer comprising in combination a pair of voltage supply terminals, an electric valve having an anode and a control electrode and provided with supply connections from said anode and cathode to said terminals, a control device for initiating conduction in the anode-cathode circuit of said valve, means for controlling said valve to conduct single pulses of current separated by predetermined intervals of time comprising a resistor capacitor timing provided with connections from the capacitor thereof to said cathode and control electrode and having a plurality of timing adjustment connections and a transformer having its primary winding connected to be energized by conduction in said anode-cathode circuit and its secondary winding connected to charge said capacitor negative at the terminal connected to said control electrode to render said valve non-conducting, a plurality of relays designated for operation in a predetermined sequence and each having an operating coil, connections from the operating coil of the first of said relays in said sequence to said anode-cathode circuit for effecting energization thereof in response to conduction of said current pulses in said circuit, contact means on each of said relays responsive to energization of its operating coil for establishing said timing circuit through a corresponding one of said timing adjustment connections and for connecting to said anode-cathode circuit for energization by the next succeeding current pulse therein the operating coil of the relay next in said sequence thereby to correlate the sequential operation of said relays and said time intervals, additional contacts on each of said relays for completing a sealing-in circuit for its operating coil in response to energization thereof and interlock contacts on the last of said relays in said sequence in the sealing-in circuit of said first relay for resetting all of said relays in response to operation of said last relay.

7. A sequence timer comprising in combination, a pair of alternating voltage supply terminals, an electric valve having an anode, a cathode, a control electrode and provided with supply connections from said anode and cathode to said terminals, a control device for initiating conduction in the anode-cathode circuit of said valve, means for controlling said valve to conduct, single pulses of current of half cycle duration separated by time intervals comprising a resistor-capacitor timing circuit provided with connections from the capacitor thereof to said cathode and control electrode and having a plurality of timing adjustment connections and a transformer having its primary winding connected to be energized by said current impulses in said anode-cathode circuit and the secondary winding connected to charge said capacitor negative at the terminal connected to said control electrode to render said valve non-conducting at the end of a single half cycle of conduction, a plurality of relays designated for operation in a predetermined sequence and each having an operating coil, connections from the operating coil of the first of said relays in said sequence to said anode-cathode circuit for effecting energization thereof in response to conduction of said pulses in said circuit, and contact means on each of said relays responsive to energization of its operating coil for establishing said timing circuit through a corresponding one of said timing adjustment connections and for connecting to said anode-cathode circuit for energization by the next succeeding current pulse therein the operating coil of the relay next in said sequence thereby to correlate the sequential operation of said relays with said time intervals.

8. A sequence timer comprising in combination, a pair of alternating voltage supply terminals, an electric valve having an anode, a cathode, a control electrode and provided with supply connections from said anode and cathode to said terminals, a control device for initiating conduction in the anode-cathode circuit of said valve, means for controlling said valve to conduct, single pulses of current of half cycle duration separated by time intervals comprising a resistor-capacitor timing circuit provided with connections from the capacitor thereof to said cathode and control electrode and having a plurality of timing adjustment connections and a transformer having its primary winding connected in series relationship in said anode-cathode circuit to be energized by said current pulses therein and its secondary winding connected to charge said capacitor negative at the terminal connected to said control electrode to render said valve non-conducting at the end of the first half cycle of conduction, a plurality of relays designated for operation in a predetermined sequence and each having an operating coil, connections paralleling the operating coil of the first of said relays in said sequence with said primary winding for effecting energization thereof in response to conduction of said pulses in said anode-cathode circuit, and contact means on each of said relays responsive to energization of its operating coil for establishing said timing circuit through a corresponding one of said timing adjustment connections and for connecting in parallel with said primary winding for energization by the next succeeding current pulse in said anode-cathode circuit the operating coil of the relay next in said sequence thereby to correlate the sequential operation of said relays with said time intervals.

9. A sequence timer comprising in combination, a pair of alternating voltage supply terminals, an electric valve having an anode, a cathode, a control electrode and provided with supply connections from said anode and cathode to said terminals, a control device for initiating conduction in the anode-cathode circuit of said valve, means for controlling said valve to conduct, single pulses of current of half cycle duration separated by time intervals comprising a resistor-capacitor timing circuit provided with connections from the capacitor thereof of said cathode and control electrode and having a plurality of timing adjustment connections and a transformer having its primary winding connected in series in said anode-cathode circuit to be energized by said current pulses and its secondary winding connected in series with said capacitor between said cathode and said control electrode and poled to charge said capacitor negative at the control electrode terminal to render said valve non-conducting at the end of the first half cycle of conduction, a plurality of relays designated for operation in a predetermined sequence and each having an operating coil, connections paralleling the operating coil of the first of the relays in said sequence and said primary winding for effecting energization of said coil in response to said pulses, and contact means on each of said relays responsive to energization of its operating coil for establishing said timing circuit through a corresponding one of said timing adjustment connections, and for connecting in parallel with said primary winding for energization by the next suceeding current pulse the operating coil of the relay next in said sequence thereby to correlate the sequential operation of said relays with said time intervals.

10. A sequence timer comprising in combination, a pair of voltage supply terminals, an electric valve having an output circuit provided with supply connections to said terminals and an input control circuit, a control device for initiating conduction in said output circuit, means for controlling said valve to conduct single pulses of current separated by predetermined time intervals comprising a resistor-capacitor timing circuit provided with connections from the capacitor thereof to said input circuit and having a plurality of timing adjustment connections and a transformer having its primary winding connected to said output circuit and its secondary winding connected and poled to charge said capacitor to supply a turn-off voltage to said input circuit, means for initiating a sequence of operations comprising a plurality of relays designated for operation in a predetermined sequence and each having an operating coil, connections from the operating coil of the first of said relays in said sequence to said output circuit for effecting operation of said first relay in response to conduction in said output circuit, contact means operated by each of said relays for connecting to said output circuit the operating coil of the relay next in said sequence and for establishing said timing circuit through a corresponding one of said timing adjustments, a plurality of load circuits each controlled by a different one of said relays for initiating a sequence of operations and connections for effecting an exchange of the load circuit of one of said relays for the load circuit of another to effect a change in the sequence of said operations and for making related changes in said time adjustment connections.

11. A sequence timer comprising in combination, a pair of voltage supply terminals, an electric valve having an output circuit provided with supply connections to said terminals and an input control circuit, a control device for initiating conduction in said output circuit, means for controlling said valve to conduct in said output circuit single pulses of current separated by predetermined intervals of time comprising a resistor-capacitor discharge timing circuit provided with connections from the capacitor thereof to said input circuit and having a plurality of timing adjustment connections and a transformer having its primary winding connected to said output circuit for energization by said current pulses and a secondary winding poled and connected to charge said capacitor to a polarity to supply a turn-off voltage to said input circuit, a selector switching device for preselecting certain of said timing adjustments corresponding to said predetermined intervals a plurality of relays designated for operation in a predetermined sequence each having an operating coil, connections from the operating coil of the relay first in said sequence to said output circuit for effecting operation thereof in response to one of said current pulses, contact means operated by each of said relays for connecting to said output circuit the operating coil of the relay next in said sequence and for establishing said timing circuit through a corresponding one of said preselected timing adjustments thereby to correlate the time intervals between the successive operations of said relays and the time intervals separating the sequential conductions of said valve, a plurality of load circuits each controlled by a different one of said relays for initiating a plurality of operations in a predetermined sequence, and connections for effecting between two of said relays an exchange of their load circuits to change the sequence of said operations and for effecting related changes in said timing adjustments.

No references cited.